UNITED STATES PATENT OFFICE.

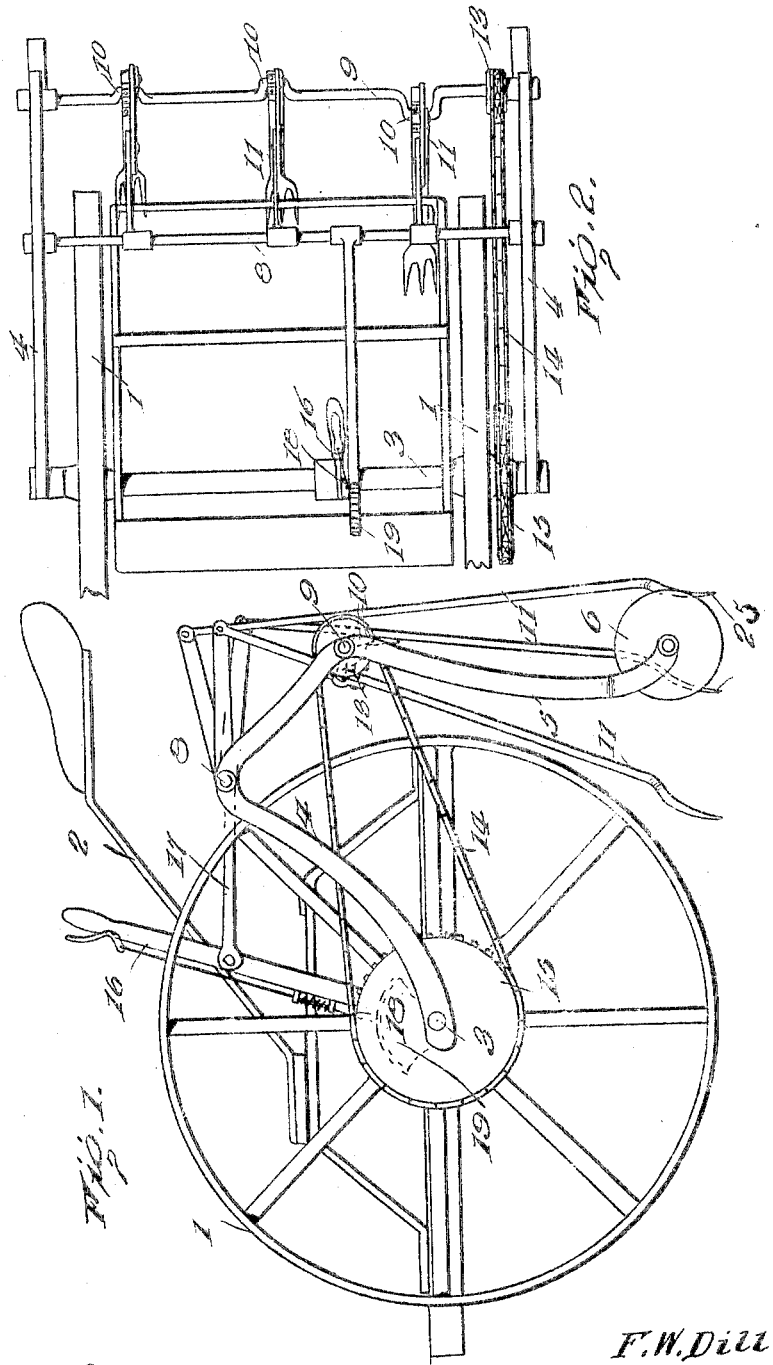

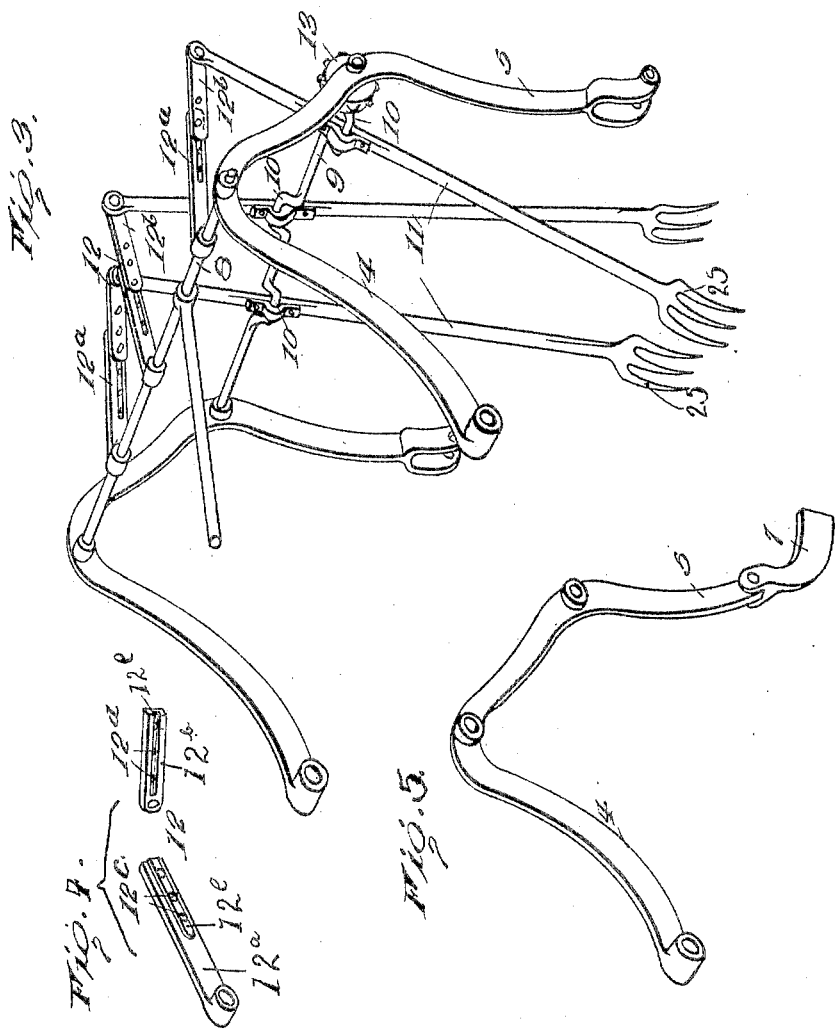

FREDRICK W. DILL AND JOHN R. HILL, OF LINCOLN, KANSAS.

HAY-TEDDER.

No. 797,348.          Specification of Letters Patent.          Patented Aug. 15, 1905.

Application filed March 28, 1905. Serial No. 252,604.

*To all whom it may concern:*

Be it known that we, FREDRICK W. DILL and JOHN R. HILL, citizens of the United States, residing at Lincoln, in the county of Lincoln and State of Kansas, have invented certain new and useful Improvements in Hay-Tedders, of which the following is a specification.

The present invention comprises an improved hay-tedder adapted to be connected with a vehicle or mowing-machine to be propelled thereby when being advanced over a field.

The invention resides, essentially, in the special arrangement of the parts comprising the tedding mechanism, the connections, and the means for adjusting said parts, the details of which will be pointed out as the description proceeds.

For a full description of the invention and the merits thereof and also to acquire a knowledge of the details of construction of the means for effecting the result reference is to be had to the following description, and accompanying drawings, in which—

Figure 1 is a side elevation of a tedder, the same being operably connected with a suitable vehicle, which may be a mower or the like, said tedder being constructed in accordance with the invention. Fig. 2 is a broken plan view. Fig. 3 is a detail perspective view showing the tedder-frame alone, the fork-bars, and the operating connections for these parts. Fig. 4 is a detail view showing a form of link which may be used to connect the fork-bars to the tedder-frame. Fig. 5 is a perspective view of a side bar of the frame, a runner in position thereon.

Corresponding and like parts are referred to in the following description, and indicated in all the views of the drawings by the same reference characters.

In the drawings, the numeral 1 indicates the ground-wheels of a mowing-machine or vehicle, the numeral 2 a suitable seat for the driver, and the numeral 3 the axle upon which the wheels 1 are mounted. The tedder-frame comprises spaced longitudinal bars 4, pivotally connected at their front ends with the axle 3 and having their rear end portions curved downwardly, as shown at 5, and provided with wheels or runners. The lower extremities of the bars 4 may have a roller 6 (see Fig. 1) or a runner 7, as shown in Fig. 5, applied thereto. The rollers 6 and the runners 7 may be used under various conditions of service, according to the desire of the operator. The bars 4 of the tedder-frame curve upwardly from the axle 3, and at the uppermost portions said bars are connected by means of a transverse rod 8. From the rod 8 the bars 4 curve downwardly and a short distance in rear of the bar 8, and having its ends journaled in bearings, in the longitudinal bars 4 is mounted a crank-shaft 9. The crank-shaft 9 is provided with a number of cranks 10, which latter are pivotally connected with the fork-bars 11 at a point between the ends of the latter. The fork-bars 11 are provided with a suitable number of tines 25 at the lower extremities thereof, and the upper extremities of these fork-bars are connected by links 12 with the transverse member 8 of the tedder-frame. The fork-bars 11 are actuated by means of a sprocket-wheel 13, mounted upon the crank-shaft 9 near one end, said sprocket 13 being connected by a sprocket-chain 14 with the sprocket-wheel 15, suitably attached to an end of the axle 3. It will thus be noted that as the mowing-machine or other vehicle is advanced motion will be communicated from the axle 3 to the crank-shaft 9 and a kicking movement will be imparted to the fork-bars 11, so as to cause the same to throw hay in a manner which will be obvious to those versed in this art. A hand-lever 16 is pivoted in advance of the tedder-frame and is connected by a rod 17 with the rod 8 of said frame. This lever is provided with a hand-operated latch 18, coöperating with a suitable toothed segment 19 to hold the lever in a predetermined position. By moving the lever forwardly or rearwardly the tedder-frame will be raised or lowered, respectively, so that the fork-bars 11 may be correspondingly positioned to throw the same into and out of operation. In order that the movement of the fork-bars 11 may be varied, the links 12 may be made in two sections $12^a$ and $12^b$, each section having adjustable connection at one end because of the provision of a plurality of openings $12^c$, through which a suitable fastening member is passed. By adjusting the connection of the sections $12^a$ and $12^b$ of the links 12 the throw or kicking movement of the fork members 11 may increased or decreased. If desired, the parts $12^a$ and $12^b$ may have an interlocking groove-and-tongue connection (shown at 12$^d$ and 12$^e$) to rigidly hold the sections of the links in alinement.

Having thus described the invention, what is claimed as new is—

1. In a tedder, the combination of the frame composed of the longitudinal spaced bars 4 curving upwardly from their front ends and extending downwardly at the rear ends as shown at 5, the transverse bar 8 connecting the bars 4 at their uppermost portions, the crank-shaft 9 journaled at its ends in the bars 4, the cranks 10, the fork-bars 11 pivoted at a point between their ends to the cranks 10, and the links 12 connecting the upper extremities of the fork-bars 11 to the transverse bar 8.

2. In a tedder, the combination of the frame composed of the longitudinal spaced bars 4 curving upwardly from their front ends and extending downwardly at the rear ends as shown at 5, the transverse bar 8 connecting the bars 4 at their uppermost portions, the crank-shaft 9 journaled at its ends in the bars 4, the cranks 10, the fork-bars 11 pivoted at a point between their ends to the cranks 10, the links 12 connecting the upper extremities of the fork-bars 11 to the transverse bar 8, and means for lengthening and shortening the links for the purpose specified.

3. In a tedder, the combination of the frame composed of the longitudinal spaced bars 4 curving upwardly from their front ends and extending downwardly at the rear ends as shown at 5, the transverse bar 8 connecting the bars 4 at their uppermost portions, the crank-shaft 9 journaled at its ends in the bars 4, the cranks 10, the fork-bars 11 pivoted at a point between their ends to the cranks 10, the links 12 connecting the upper extremities of the fork-bars 11 to the transverse bar 8 the links being composed of sections provided with a plurality of openings at one end, and a fastening passing through selected openings of the sections to connect the sections of the links together to admit of adjustment of said sections.

In testimony whereof we affix our signatures in presence of two witnesses.

FREDRICK W. DILL. [L. S.]
JOHN R. HILL. [L. S.]

Witnesses:
MARGARET D. GRAVES,
IDA E. ALLISON.